United States Patent [19]
Horton et al.

[11] Patent Number: 5,913,368
[45] Date of Patent: Jun. 22, 1999

[54] METHOD TO INCREASE N-USE EFFICIENCY AND REDUCE LEACHING

[75] Inventors: Robert Horton; Daniel E. Ressler; Thomas C. Kaspar; James L. Baker, all of Ames, Iowa

[73] Assignee: Iowa State University Research Foundation, Inc., Ames, Iowa

[21] Appl. No.: 09/118,707

[22] Filed: Jul. 17, 1998

Related U.S. Application Data

[62] Division of application No. 08/870,561, Jun. 6, 1997, Pat. No. 5,797,459.

[51] Int. Cl.⁶ .................................................. A01C 23/00
[52] U.S. Cl. ........................... 172/133; 111/119; 111/123; 111/124
[58] Field of Search ..................... 172/133, 156, 172/155, 106, 182, 192, 149, 151; 111/119, 121, 123, 124, 118, 120, 168, 192, 900

[56] References Cited

U.S. PATENT DOCUMENTS

| | | | |
|---|---|---|---|
| 1,893,512 | 1/1933 | Zuckerman | 111/900 X |
| 1,906,139 | 4/1933 | Denstädt et al. | 111/900 X |
| 1,908,255 | 5/1933 | Kaupke | 111/900 X |
| 2,222,015 | 11/1940 | Bateman | 111/900 X |
| 3,023,717 | 3/1962 | Cline | 111/900 X |
| 3,306,241 | 2/1967 | Copple | 172/156 X |
| 4,092,936 | 6/1978 | Griffin et al. | 111/900 X |
| 4,167,910 | 9/1979 | Pretzer | 111/900 X |
| 4,211,285 | 7/1980 | Pajtas | 111/900 X |
| 5,333,694 | 8/1994 | Roggenbuck et al. | 172/156 |
| 5,623,997 | 4/1997 | Rawson et al. | 172/156 |
| 5,782,307 | 7/1998 | Forsyth | 172/156 |
| 5,797,459 | 8/1998 | Horton et al. | 111/119 X |

FOREIGN PATENT DOCUMENTS

| | | | |
|---|---|---|---|
| 471076 | 5/1975 | U.S.S.R. | 111/900 |
| 21965 | 11/1915 | United Kingdom | 111/900 |

OTHER PUBLICATIONS

Kiuchi et al., "Using Subsurface Flow Barriers to Reduce Nitrate Leaching", Proc. of 1992 Leopold Center Conf. Ames, IA pp. 82–83, 1992.

Horton et al., "Subsurface Flow Barriers to Reduce Nitrate Leaching", Proc. of Fourth Annual Crop Production and Protection Conference, Ames IA, pp. 59–68, Dec. 1992.

Kiuchi et al., "Leaching Characteristics of Repacked Soil Columns as Influenced by Subsurface Flow Barriers", Published in Soil Sci. Soc. Am. J. 58:1212–1218 (1994).

Ressler et al., "Localized Compaction and Doming to Increase N–use Efficiency and Reduce Leaching", by Clean Water–Clean Environment 21st Century—Conference Proceedings–O vol. III: Practices, Systems & Adoption Mar. 5–8, 1995–Published by ASAE, Mar. 1995.

*Primary Examiner*—Christopher J. Novosad
*Attorney, Agent, or Firm*—Zarley, McKee, Thomte, Voorhees & Sease

[57] ABSTRACT

A tool bar for placement of a band of fertilizer in soil has a vertical knife with a horizontal blade thereon to create an inverted T-shaped slot in the soil. A band of fertilizer is placed in the bottom of the slot through a tube on the knife. A first coulter fills the slot with soil and compacts the soil above the band. A second coulter forms a mound of soil over the compacted soil and creates an elongated furrow in the soil above and laterally removed from the band. The method of placement of a band of fertilizer in soil sequentially moves the soil and creates the band as accomplished by the foregoing structure.

3 Claims, 4 Drawing Sheets

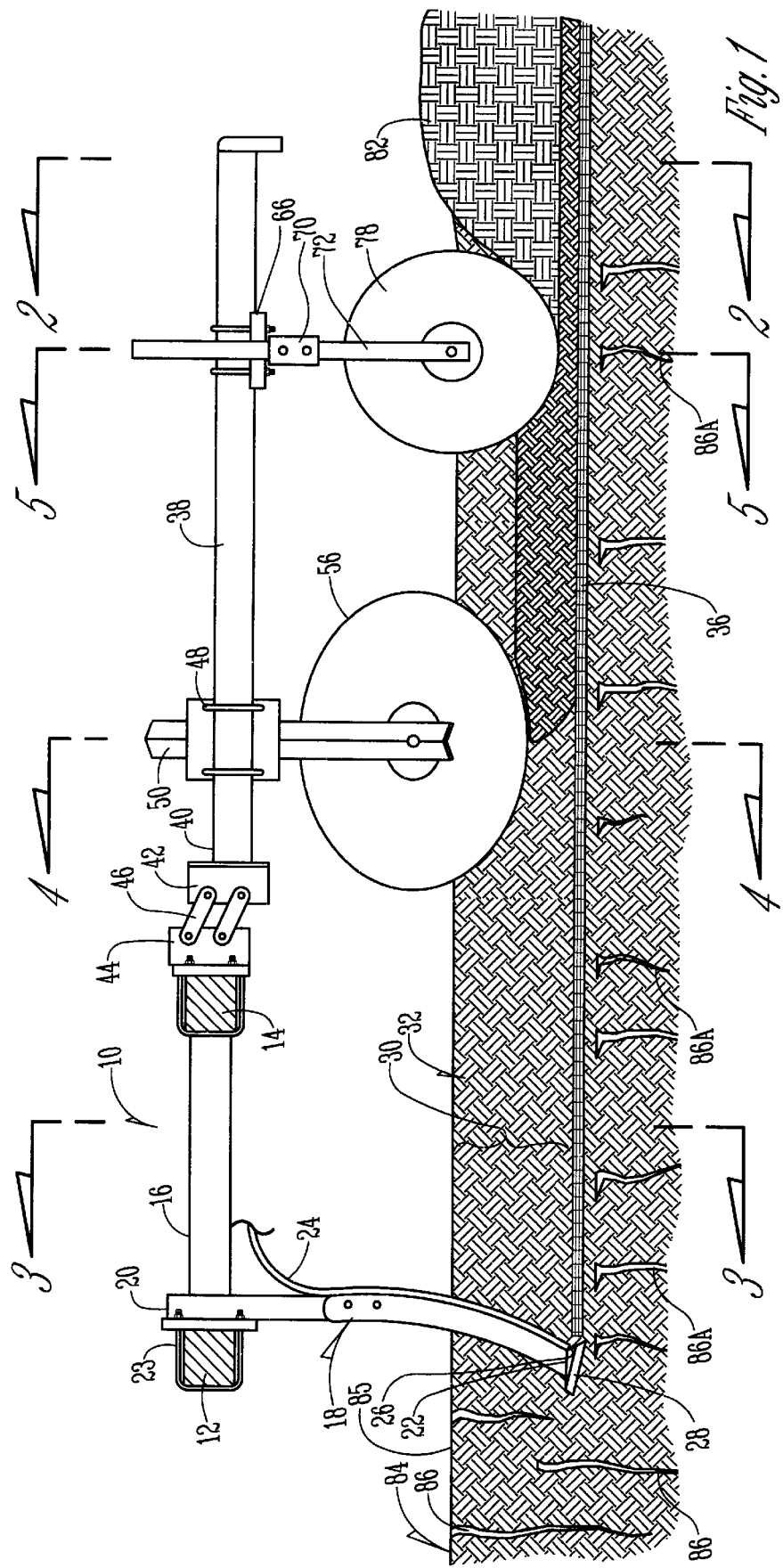

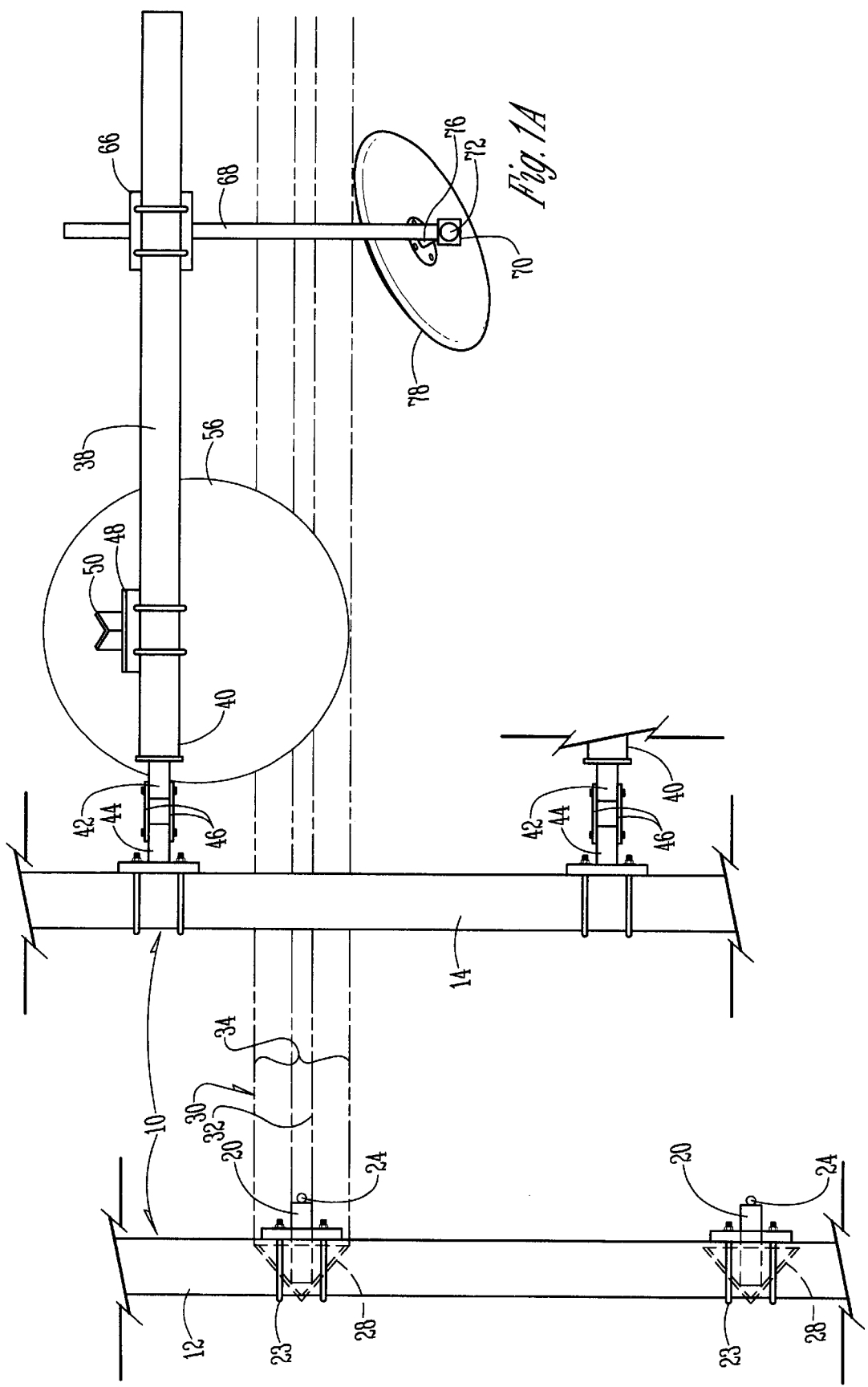

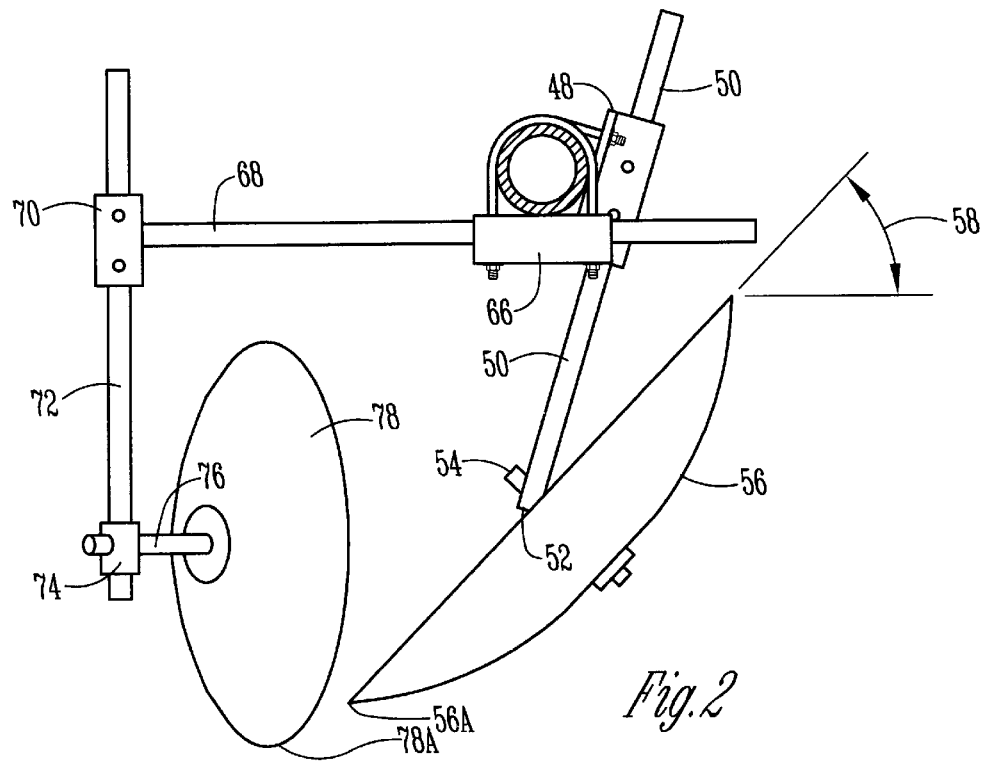
*Fig.2*
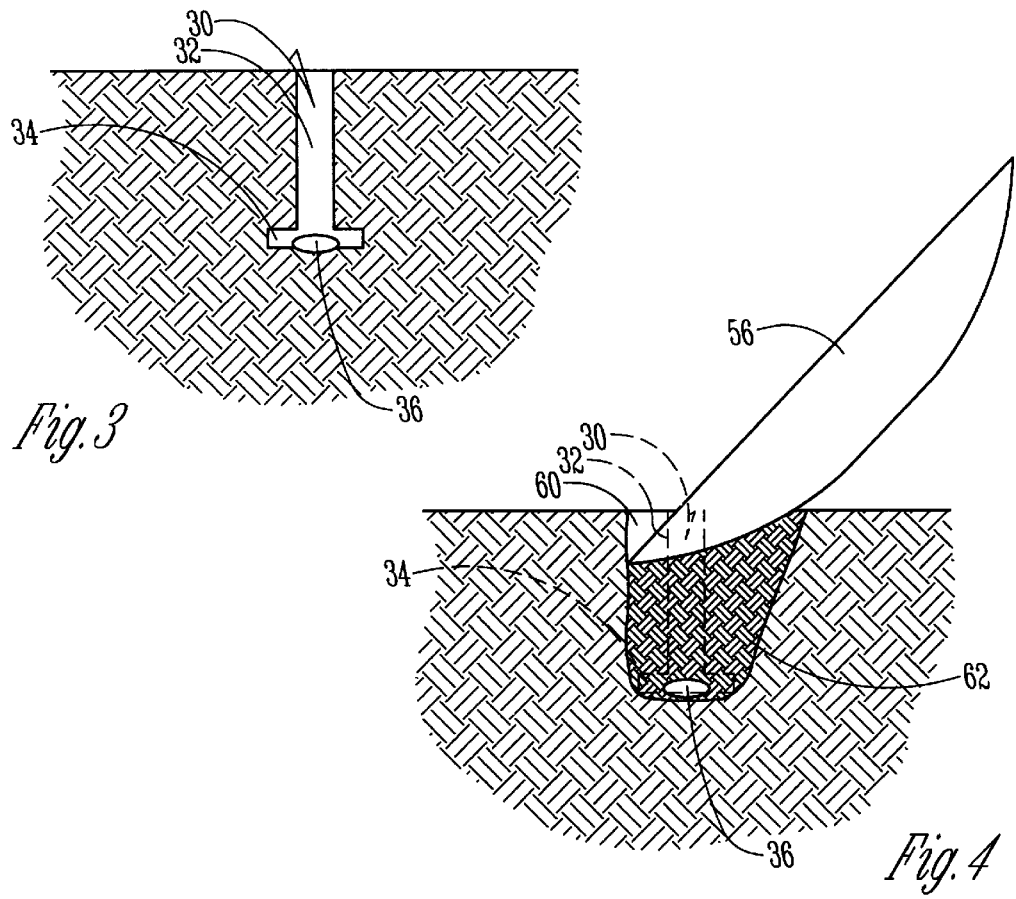
*Fig.3*
*Fig.4* ically extending bar member 12 spaced from and parallel to a rearward

METHOD TO INCREASE N-USE EFFICIENCY AND REDUCE LEACHING

This application is a divisional of application Ser. No. 08/870,561 filed Jun. 6, 1997, now U.S. Pat. No. 5,797,459.

This invention was made with government support under the USDA using Hatch funds; IAHEES IA Project No. 3258. The government has certain rights to this invention.

BACKGROUND OF THE INVENTION

Subsurface fertilizer banding by using a conventional knife applicator is one of the most common methods for nitrogen (N) fertilization of corn in the North Central Region of the USA. A knife is pulled through the soil to open a furrow into which a fertilizer can be injected. Anhydrous ammonia ($NH_3$) is the most widely used N-source in this type of application, but solutions such as urea ammonium nitrate (often designed UAN) are also used. Knifing incorporates the N fertilizer so that volatilization losses of $NH_3$ can be limited. However, N fertilizer losses by nitrate-nitrogen ($NO_3$—N) leaching from the root zone are as troubling as losses to volatilization, because of the environmental and health risks associated with $NO_3$—N contamination of and surface water resources receiving subsurface drainage water resources. High concentrations of $NO_3$—N in rural drinking water wells suggest that conventional fertilizer application practices should be evaluated and perhaps adapted to prevent agricultural N from impacting water quality.

Conventional knifing techniques leave a porous slit above the injected fertilizer. This knife slit creates a soil zone more favorable to water movement than the surrounding soils. Thus, two soil zones are created: 1) undisturbed soil with small N fertilizer concentration; and 2) loose, porous, and disturbed soil with large N fertilizer concentration. The physical properties of these two zones are very different, and the normal practice is to leave them in this state. Additional management of the soil is necessary to reduce water movement through the fertilizer band and the probability of N movement from the fertilized zone.

Conventional tillage after chemical application, which mixes the fertilized soil and reduces macropore continuity, delays chemical breakthrough deeper in the soil compared with no-till systems. The presence of numerous macropores allows rapid flow of water deep into the soil. If that rapidly moving water contacts $NO_3$—N fertilizer, then the chemical is moved rapidly as well. Studies of solute movement under ridge tillage management indicate that solutes are less susceptible to leaching if they are placed under the ridge peak instead of in the ridge valley. In these instances, chemicals are placed in positions where water is less likely to infiltrate, thus chemical movement and leaching are reduced. Finally, the presence of a compacted layer near the fertilized zone slows the flow of water and chemical leaching by altering the water flow path around the barrier.

However, equipment and a method for dealing with the foregoing problems do not exist in a single apparatus or method of applying the N fertilizer.

It is therefore a principal object of this invention to provide an apparatus and a method for simultaneously accomplishing the following:

1) remove the macropore flow pathways immediately below the fertilizer band;
2) close the knife slit that forms during conventional application techniques;
3) form a compacted soil layer above the fertilizer band to impede the flow of infiltrating surface water and divert the water away from the fertilizer band; and
4) form a dome over the fertilizer band to direct any surface runoff away from the band so that the water infiltrates the soil via a furrow away from the fertilizer band.

These and other objects will be apparent to those skilled in the art.

SUMMARY OF THE INVENTION

The apparatus of this invention for injecting N into the soil to increase N use efficiency and to reduce N leaching has a tool bar comprising forward and rearward parallel laterally extending bar members. At least one injecting knife having upper and lower ends is rigidly secured by its upper end to the forward bar member. A N injection tube is secured to the injection knife and is in communication with a source of N. The tube terminates at a lower end adjacent to the lower end of the knife. A substantially horizontal cutting blade is secured to the lower end of the knife to create an inverted T-shaped furrow when the knife is submerged into the soil and moved in a forwardly direction. An elongated horizontal band of fertilizer is deposited from the lower end of the tube in the bottom of the inverted T-shaped furrow following the horizontal portion of the cutting blade.

A rearwardly extending beam has a forward end vertically and pivotally secured to the second bar member. The beam extends rearwardly from the second bar member in a direction parallel to the fertilizer band and is spaced above the band and is laterally offset therefrom. A cone disk guide wheel is rotatably secured to the second bar member and is positioned in an inclined position so that a lower portion thereof intersects the vertical portion of the inverted T-shaped furrow above the fertilizer band to create a second furrow in place of the inverted T-shaped furrow. The cone disk guide wheel also creates a compacted soil layer above the fertilizer band.

A covering disk is secured to the beam rearwardly of the cone disk guide wheel and is laterally offset from the beam in a direction opposite to that of the cone disk guide wheel so that a lower portion thereof can penetrate soil above and to one side of the fertilizer band so that the covering disk can push soil into and over the second furrow, the compacted soil layer, to create a dome of soil over the second furrow and the fertilizer band to create a third furrow above and laterally spaced from the fertilizer band.

The method of the invention involves the functional steps created by the aforesaid apparatus.

BRIEF DESCRIPTION OF THE DRAWINGS

FIG. 1 is a longitudinal sectional view through the apparatus of this invention as it is in its operating mode moving forwardly through a field in a left-hand direction;

FIG. 1A is a plan view of the device in FIG. 1;

FIG. 2 is a partial sectional view taken on line 2—2 of FIG. 1 with the soil being removed to better show the inter-relationship of various structural components;

FIG. 3 is an enlarged scale sectional view taken on line 3—3 of FIG. 1;

FIG. 4 is an enlarged scale sectional view taken on line 4—4 of FIG. 1; and

BRIEF DESCRIPTION OF THE DRAWINGS

Figure 5:
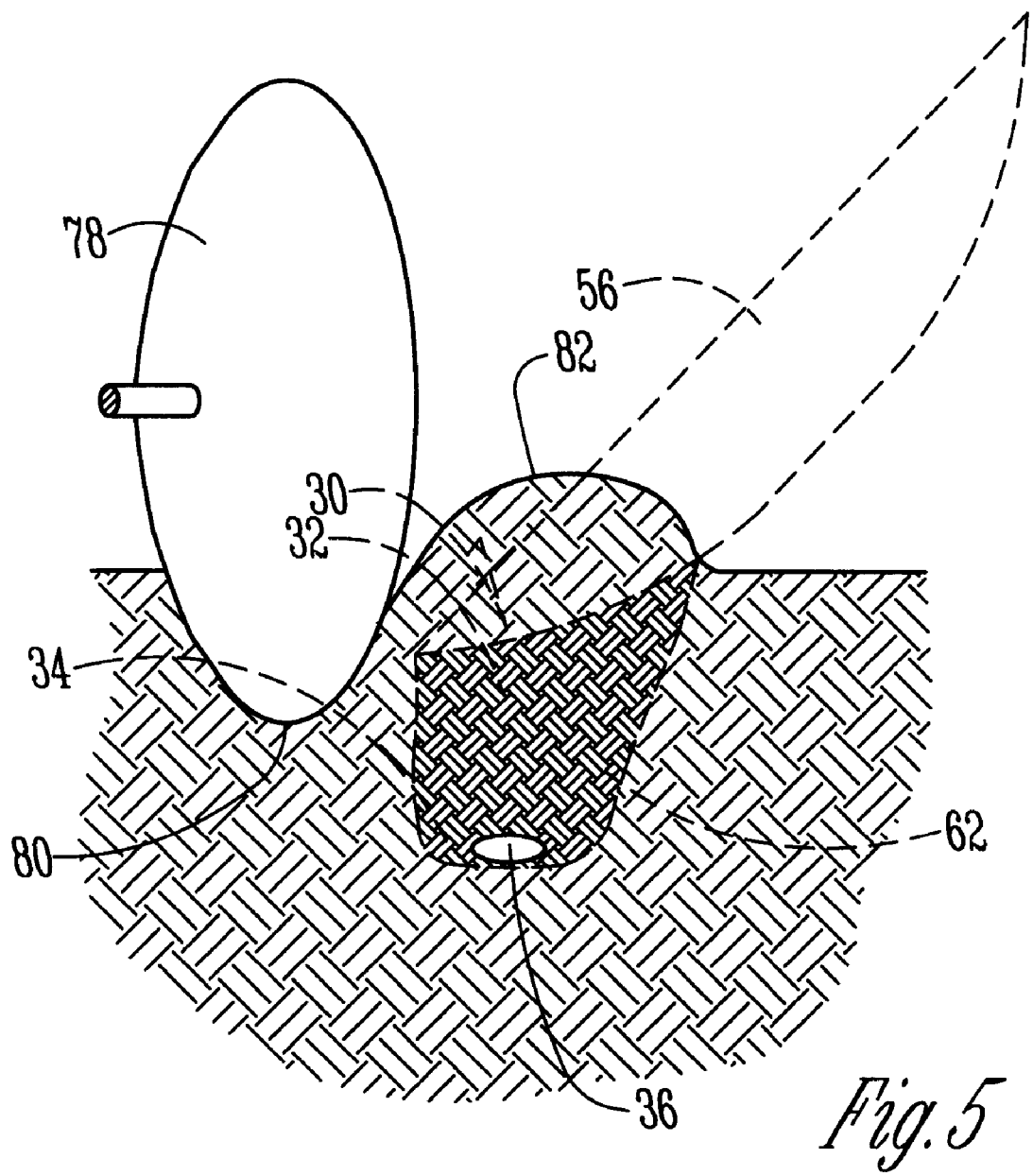
FIG. 5 is a sectional view taken on line 5—5 of FIG. 1.

A conventional tool bar 10 has a forward laterally extending bar member 12 spaced from and parallel to a rearward lateral extending bar member 14, with the ends of the bar members 12 and 14 being joined together by conventional end members 16 (FIG. 1).

A conventional nitrogen injection knife 18 has an upper end 20 and a lower end 22 (FIG. 1). Knife 18 is secured to forward bar member 12 by conventional bracket assembly 23. A conventional N injection tube 24 is secured to and extends downwardly on the rearward surface of injection knife 18 and terminates in a lower end 26 adjacent the lower end 22 of knife 18. A horizontally disposed V-shaped horizontal blade or smearing shoe 28 is secured to the lower end 22 of injection knife 18 in spaced relation to the lower end 26 of tube 24 to permit nitrogen to be deposited behind the blade 28. Typical dimensions of blade 28 would be 1.2 cm. thick, 9 cm. long, and 10 cm. wide. The injection knife 18 and the blade 28 create an inverted T-shaped slot or furrow 30 (FIG. 3) in the soil as the device moves from right to left as shown in FIG. 1. The inverted T-shaped slot 30 has a vertical slot portion 32 which intersects a bottom horizontal slot portion 34 (FIG. 3). A band of fertilizer 36 is deposited on the bottom horizontal slot portion 34 from the lower end 26 of injection tube 24 which is connected to a source of N(not shown).

As best shown in FIGS. 1 and 2, a rearwardly extending cylindrical beam 38 is laterally disposed with respect to the slot 30 and injection knife 18. (FIGS. 1 and 1A). Beam 38 has a forward end 40 to which is secured bracket 42. A conventional bracket assembly 44 is secured to rearward bar member 14, and the brackets 42 and 44 are pivotally secured together by four pivotally secured links 46 (FIGS. 1 and 1A).

A conventional bracket assembly 48 (FIGS. 1A and 2) is secured to beam 38 just rearwardly of the forward end 40 of the beam. As shown in FIG. 2, a support shaft 50 is adjustably but fixedly mounted within bracket 48 by any conventional means and extends at an angle downwardly and laterally with respect to the longitudinal axis of beam 38. As seen in FIG. 2, the lower end 52 of support shaft 50 terminates below and in substantial vertical alignment with the longitudinal axis of beam 38. An axle 54 is rigidly secured by welding or the like to the lower end 52 of shaft 50 and extends downwardly and laterally with respect to the shaft 50 (FIG. 2). A cone disk guide wheel or coulter 56 with a periphery 56A is rotatably secured by conventional means to the lower end of axle 54. Angle 58 shown in FIG. 2 has a magnitude of about 53° which reflects the preferred angular position of the coulter 56. Coulter 56 has a preferred diameter of 50.8 cm., and a concave thickness of approximately 9 cm. As shown in FIG. 4, in its operating position, coulter 56 intersects the vertical portion 32 of inverted T-shaped slot 30 to create furrow 60 and to fill the portion of slot 30 below the coulter. In addition, coulter 56 creates a compacted soil layer 62 below the coulter and extending downwardly to the fertilizer band 36.

As shown in FIG. 2, a bracket assembly 66 is secured to beam 38 at a location rearwardly of coulter 56. A horizontal arm 68 is adjustably but fixedly secured to bracket assembly 66 and extends from beam 38 in a lateral direction away from coulter 56. (FIG. 2). The outer end of arm 68 has secured thereto a bracket 70 in which a vertical arm 72 is adjustably but fixedly supported. The lower end of arm 72 has fitting 74 secured thereto which supports a horizontally disposed axle 76. Axle 76 is disposed at an angle with respect to arm 68 and extends in a direction back towards the position of coulter 56. A covering disk 78 with a periphery 78A is secured to the outer end of axle 76. By reason of the angular position of axle 76, the covering disk or coulter 78 is disposed at an angle with respect to the original position of inverted T-shaped slot 30. With reference to FIG. 5, covering disk 78 creates a third furrow 80 adjacent the furrow 60 (FIG. 4) created by disk 56. Disk 78 creates an elongated longitudinal mound or dome of soil 82 adjacent furrow 80 which serves to fill the furrow 60 created by the disk 56. This dome of soil 82 is located on top of the compacted soil layer 62. (FIG. 5).

Again, with reference to FIG. 1, the soil 84 having an upper surface 85 is typically infested with a plurality of macropores 86 created by natural fissures in the soil or by worms, etc. The passage of the V-shaped blade 28 through the soil severs and destroys the macropores 86 above the band 36 of fertilizer band 36. See the severed macropores 86A in FIG. 1.

The soil mixing and macropore disruption will reduce chemical leaching. This macropore disruption, a compacted soil layer above the N fertilizer, and a surface dome over the compacted soil layer and the end fertilizer band will slow the movement of solutes. Slower chemical movement will increase nutrient residence time in the root zone and allow more efficient uptake of the nutrient.

The device of this invention will disrupt the macropores, create the localized compacted layer, and form the surface dome which will alter water flow pathways around the end fertilizer band to slow and reduce the movement of water through the band, thus reducing leaching.

After the injection knife 18 has sliced the soil vertically creating slot 30, with the macropores 86 closed and sealed (see 86A, FIG. 1) by smearing the soil horizontally at the base of the knife 18 through the triangular blade 28, the cone disk guide wheel 56 follows the knife to close the slot 30 that remains after the fertilizer is injected. This action also compacts the soil to create the compacted soil layer 62 as described above. The compacted soil layer 62 is approximately 10 cm. wide and has a depth of approximately 5 cm. This forms a desired compacted wedge.

The soil modification is completed with the construction of the surface dome 82, as described above, to cover the compacted layer 62 and the fertilizer band 36.

It should be understood that the structure described heretofore moves longitudinally down the space between adjacent rows of field crop such as corn. The toolbar 10 will carry a plurality of the devices described heretofore so that a plurality of rows of a crop can be treated at the same time through one pass of the toolbar through the field. If used after planting, typically the application of the fertilizer band as described above will take place between corn rows. This invention permits the fertilizer band 36 to be protected by the dome 82 that moves surface water to either side of the fertilizer band which thus limits the quantity of water that might otherwise have infiltrated the band. The compacted soil layer 62 restricts water movement through the fertilizer band. Macropores 86 that could have been present at the location of the band will have been destroyed by the blade 38. The collective benefits of these features will permit the $NO_3$—N fertilizer band to be less susceptible to dilution and downward movement than when applied using conventional N application equipment.

From the foregoing, it is seen that this invention will achieve at least all of its stated objectives.

What is claimed is:

1. A method for injecting nitrogen into the soil to increase nitrogen use efficiency and to reduce nitrogen leaching, comprising:

providing a tool bar comprising forward and rearward parallel laterally extending bar members, providing at least one nitrogen injection knife having upper and lower ends rigidly secured by its upper end to the forward bar member, providing a nitrogen injection tube secured to at least one nitrogen injection knife and in communication with a source of nitrogen and terminating at a lower end adjacent the lower end of at least one nitrogen injection knife, providing a substantially horizontal cutting blade secured to the lower end of at least one nitrogen injection knife whereupon the lower end of said one nitrogen injection knife and said cutting blade will create an inverted T-shaped furrow comprising a vertical portion and a lower horizontal portion into which nitrogen can be deposited through the injection tube when at least one nitrogen injection knife is submerged into soil and moved in a forwardly direction, to create an elongated horizontal band of fertilizer in the horizontal portion following the cutting blade;

providing a rearwardly extending beam having a forward end vertically pivotally secured to the rearward bar member with the beam being parallel to the fertilizer band and spaced above the fertilizer band and being laterally offset therefrom, providing a coulter operatively rotatably secured to the rearward bar member and being positioned in an inclined position so that a lower portion thereof intersects the vertical portion of the inverted T-shaped furrow above the fertilizer band to create a second furrow in place of the inverted T-shaped furrow, providing a covering disc secured to the beam rearwardly from the coulter and being laterally offset from the beam in a direction opposite to that of the coulter so that a lower portion thereof can penetrate soil above and to one side of the fertilizer band so that the covering disc can push soil into and over the second furrow to create a dome of soil over the second furrow and the fertilizer band to create a third furrow above and laterally spaced from the fertilizer band.

2. The method of claim 1 wherein the horizontal blade is passed through the soil ahead and before the band of fertilizer is placed to sever and seal macropores in the soil.

3. A method for injecting nitrogen into the soil to increase nitrogen use efficiency and to reduce nitrogen leaching, comprising:

providing a tool bar, providing at least one nitrogen injecting knife having upper and lower ends rigidly secured by its upper end to the tool bar, providing a nitrogen injection tube secured to at least one nitrogen injecting knife and in communication with a source of nitrogen and terminating at a lower end adjacent the lower end of the nitrogen knife, providing a substantially horizontal cutting blade secured to the lower end of at least one nitrogen knife whereupon the lower end of the nitrogen knife and the cutting blade will create an inverted T-shaped furrow comprising a vertical portion and a lower horizontal portion into which nitrogen can be deposited through the injection tube when the nitrogen knife is submerged into soil and moved in a forwardly direction, to create an elongated horizontal band of fertilizer in the horizontal portion following the cutting blade, providing a rearwardly extending beam parallel to the fertilizer band and spaced above the fertilizer band and being laterally offset therefrom, providing a coulter operatively rotatably secured to the tool bar and being positioned in an inclined position so that a lower portion thereof intersects the vertical portion of the inverted T-shaped furrow above the fertilizer band to create a second furrow in place of the inverted T-shaped furrow, providing a covering disc secured to the beam rearwardly from the coulter and being laterally offset from the beam in a direction opposite to that of the coulter so the lower portion thereof can penetrate soil above and to one side of the fertilizer band so that the covering disc can push soil into and over the second furrow to create a dome or soil over the second furrow and said fertilizer band to create a third furrow above and laterally spaced from the fertilizer band.

* * * * *